US 6,601,072 B1

(12) United States Patent
Gerken, III (10) Patent No.: US 6,601,072 B1
(45) Date of Patent: Jul. 29, 2003

(54) METHOD AND SYSTEM FOR DISTRIBUTION OF APPLICATION DATA TO DISTRIBUTED DATABASES OF DISSIMILAR FORMATS

(75) Inventor: John Kenyon Gerken, III, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 414 days.

(21) Appl. No.: 09/598,981

(22) Filed: Jun. 21, 2000

(51) Int. Cl.$^7$ ............................................. G06F 17/30
(52) U.S. Cl. .................. 707/103 R; 707/100; 707/101; 707/4
(58) Field of Search .................. 707/10, 1, 4, 101, 707/103, 104

(56) References Cited

U.S. PATENT DOCUMENTS

| | | | |
|---|---|---|---|
| 4,943,932 A | | 7/1990 | Lark et al. .................. 364/513 |
| 5,416,917 A | * | 5/1995 | Adair et al. .................. 707/10 |
| 5,522,066 A | * | 5/1996 | Lu .................................. 707/1 |
| 5,566,332 A | * | 10/1996 | Adair et al. ................. 707/101 |
| 5,634,053 A | * | 5/1997 | Noble et al. ................... 707/4 |
| 5,649,190 A | | 7/1997 | Sharif-Askary et al. .... 395/612 |
| 5,717,924 A | | 2/1998 | Kawai .......................... 395/613 |
| 5,881,230 A | | 3/1999 | Christensen et al. ... 395/200.33 |
| 5,907,837 A | * | 5/1999 | Ferrel et al. .................... 707/3 |
| 5,930,806 A | | 7/1999 | Taira et al. ................. 707/204 |
| 5,933,837 A | * | 8/1999 | Kung ............................. 707/1 |
| 6,199,068 B1 | * | 3/2001 | Carpenter ............. 340/870.03 |
| 6,327,591 B1 | * | 12/2001 | Osborn et al. ................. 707/10 |
| 6,356,946 B1 | * | 3/2002 | Clegg et al. ................. 709/231 |

FOREIGN PATENT DOCUMENTS

| | | | |
|---|---|---|---|
| EP | 0 778 688 A2 | 11/1996 | .......... H04L/29/06 |
| JP | 08022406 A | 1/1996 | .......... G06F/12/00 |
| WO | WO 99/24919 | 5/1999 | .......... G06F/17/30 |

OTHER PUBLICATIONS

"Generalized Network Change Manager", IBM Techincal Disclosure Bulletin, vol. 39, No. 2, Feb. 1996, 239–244.
"Image Delivery System Architecture and Process Flow", Research Disclosure, May 1999, p. 722–724.

* cited by examiner

Primary Examiner—Safet Metjahic
Assistant Examiner—Cam-Linh Nguyen
(74) Attorney, Agent, or Firm—J. Bruce Schelkopf (57) ABSTRACT

A system and method for distribution of application program data to update a plurality of databases of dissimilar formats, including an application access program having a business object, a storage object and a data access object that is associated with a database. The business object creates data objects as needed and sends database access requests to the storage object. Each data access object registers with the storage object, and the storage object notifies each data access object when a data access request is received. The storage object then sends the data object to the data access objects. Data encapsulated in the data object is converted into a format for each database in which the data is to be stored. When a read request is received, data is read from a database that is designated as the primary database. When a write request is received, data is formatted into multiple formats and one format is written into each database.

18 Claims, 4 Drawing Sheets

METHOD AND SYSTEM FOR DISTRIBUTION OF APPLICATION DATA TO DISTRIBUTED DATABASES OF DISSIMILAR FORMATS

BACKGROUND OF THE INVENTION

The present invention relates in general to distributed data processing systems and more particularly to a system and method for distributing application data across distributed databases of dissimilar formats.

Many legacy enterprise applications store data in their own proprietary database formats. As the needs of business users have evolved, application software development has evolved accordingly, and one path of such evolution is the trend to move away from proprietary database architectures and towards standard relational or object-based database models.

In a relational database, data are stored in multi-dimensional tables. Each table has multiple rows and columns populated with information that describe the relationship between the data elements. Use of a relational database application, instead of a proprietary database, has the obvious advantage of opening the data to the vast array of relational database query and data manipulation tools that are pervasive among enterprise computing developers. It also allows the business user and the application itself to take advantage of the proven reliability of a commercial enterprise database engine. A relational database is not tied to a specific record and file format; customers' writing tools that interface with the database will be significantly less impacted when changes and additions are made to the database by the application developers.

Many existing software applications still work with data in their own proprietary format, thus making that data inaccessible for the vast majority of new software tools. Furthermore, many users are reluctant to replace their legacy software, because they have invested heavily in the existing software application and related tools. Users are also concerned with an abrupt transition from a legacy database that has been functioning without problem to a brand new system that may present some unforseen problems. Consequently, software developers are forced to continue support of these legacy database systems that are no longer efficient or flexible.

SUMMARY OF THE INVENTION

In view of the foregoing, it is therefore an object of the present invention to provide a system and method that enable multiple database models to be supported by a given software application simultaneously.

It is yet another object of the present invention to provide a system and method for preparing a legacy database system for migration to a new software application database system of dissimilar format.

The foregoing objectives are achieved by a distributed architecture defined by a storage subsystem that receives, from a business object, data objects encapsulating the data to be stored. The storage subsystem is responsible for distributing the data objects to converters that reform the data into the format necessary for the data object's attributes to be stored in a database of a given type.

Business objects represent a software application that needs to view or manipulate data stored in the software application's database. Business objects create data objects via a factory object. Factory objects are abstract factories that produce data objects of different types. Data objects represent some logical grouping of information that is applicable to an application. For instance, a data object representing a person for an address book application could contain all relevant information about that person that the address book tracks. Storage objects present the interface to software applications or business objects. Data access objects, or converters, have the responsibility of converting data of a data object into a different format that can be used to store the data object's encapsulated information into a database. Database interface objects receive data from the data access objects and store that data into physical databases.

Business objects have methods defined to interface software applications. When a software application is ready to write data into a database, the business object requests creation of a data object from a factory object. The data object is created and the business object then populates the data object with information from the software application. After the data object is filled with information, the business object requests the storage object to store the information in this data object into a plurality of external databases and passes this data object to the storage object. The storage object notifies local and remote data access objects about the data, and these data access objects then store the data object into their respective databases through a database interface. The data can be stored in different formats into different databases.

This system provides a path of smooth migration between two database models, and can support a greater number of database models. Databases of different formats can exist and be updated in parallel, giving users the flexibility to access the data as they see fit. Users can then migrate from a proprietary format to an industry standard format as their needs and schedules permit. The system also helps to free the development team from legacy database format restriction and allows the database to evolve as new features and functionalities are added. The legacy database could retain its current structure while features are added to the new relational database. This would allow the users to use the new features of the relational database without compromising their existing tools.

BRIEF DESCRIPTION OF THE DRAWINGS

The invention is better understood by reading the following detailed description of the preferred embodiment in conjunction with the accompanying drawings, wherein.

DETAILED DESCRIPTION OF THE PREFERRED EMBODIMENT

Figure 1:
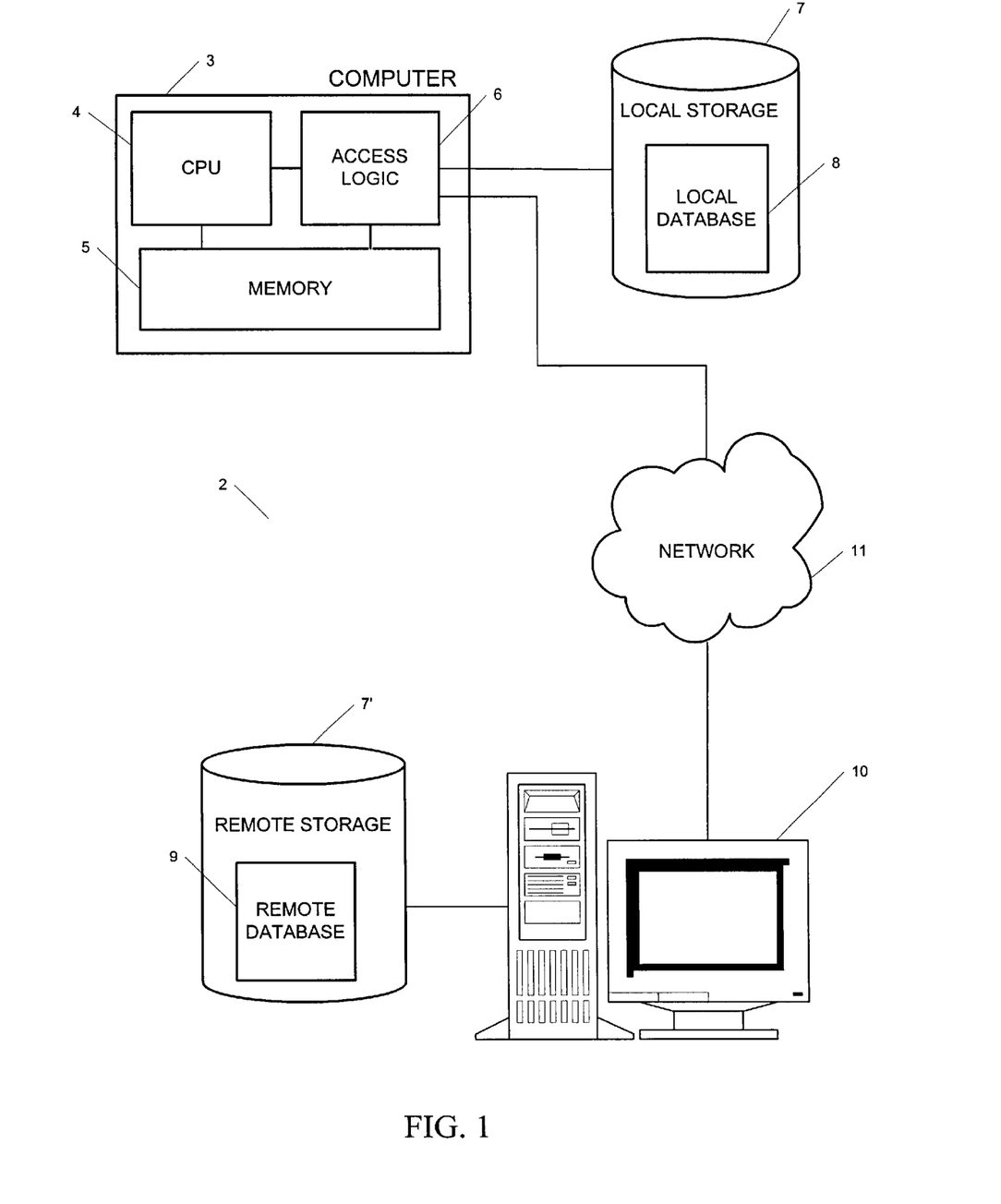
FIG. 1 depicts a system having two databases, which can be of dissimilar format, residing on different storage devices.

The following description uses terms commonly used in object-oriented design, as the invention is preferably implemented using an object-oriented programming language. Referring now in more detail to the drawings in which like numerals refer to like parts throughout the several views, FIG. 1 depicts a system 2 having two dissimilar databases to be maintained by a single computer software application. The system 2 includes a computer 3 having a central processing unit (CPU) 4, a memory device 5 and an access logic 6. It further includes a local storage device 7 with a local database 8, a server device 10, and a remote storage device 7' with a remote database 9. The remote database 9 can reside on the same storage device as the local database 8, and the remote storage device 7' can also be connected directly to the computer 3 without going through a network 11.

A computer software database application runs on the computer 3 and accesses the data stored in the local database 8; similar database software residing on the server 10 accesses data stored in the remote database 9. A local software application program can access the remote database across the network 11. The local database 8 can have a different format than that of the remote database 9. For this description, the local database 8 is considered to be a proprietary database, while the remote database 9 is considered to be a relational or object-oriented database. The computer software access application is generally developed using an object-oriented design approach, and it uses objects to represent different computing elements and to encapsulate their interface functions.

Figure 2:
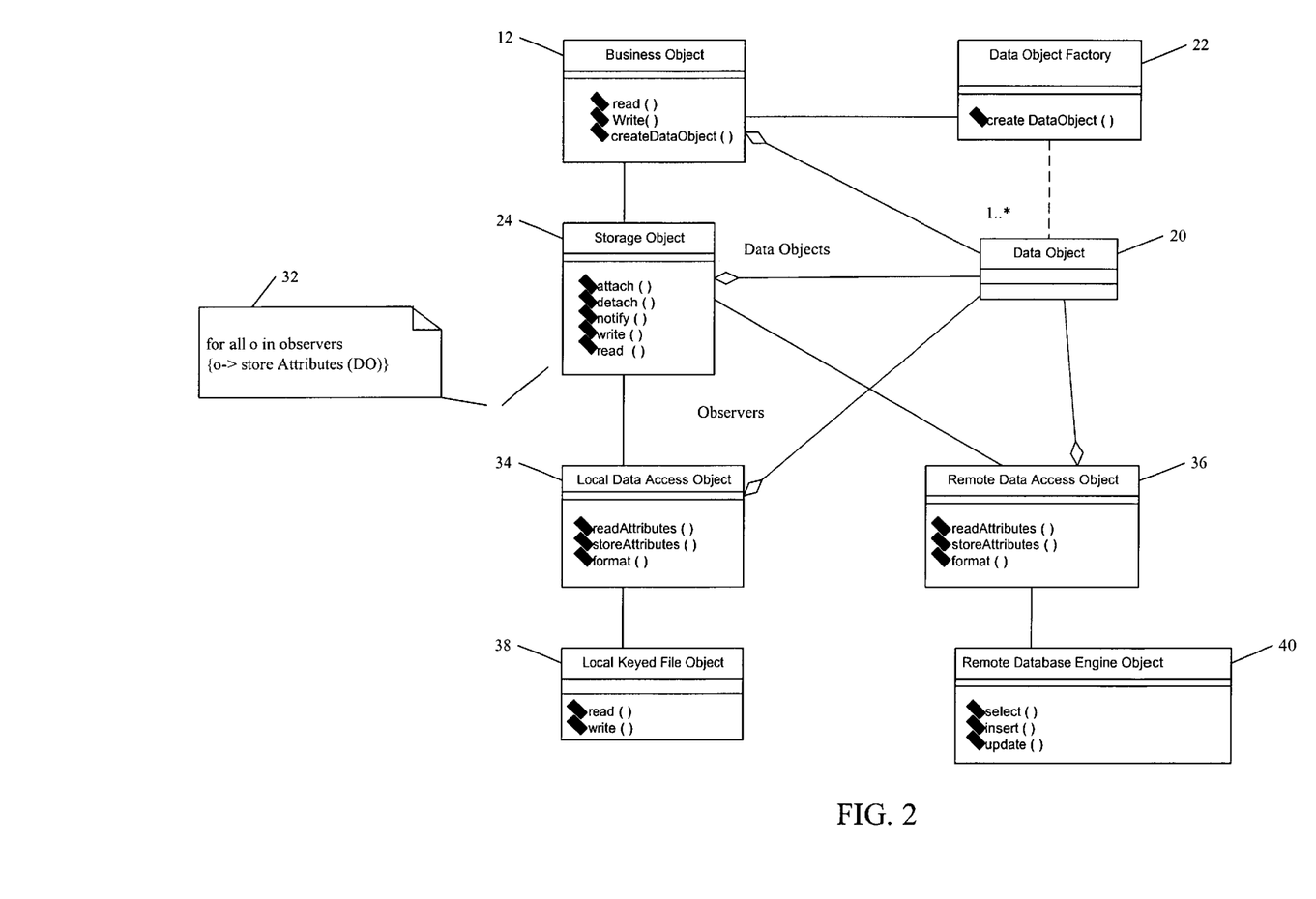
FIG. 2 is an exemplary Unified Modeling Language (UML) class diagram illustrating the relationships between different objects of the application data distribution system in accordance with a preferred embodiment of the present invention.

FIG. 2 is an exemplary Unified Modeling Language (UML) class diagram illustrating the relationship between different objects in a preferred embodiment of the present invention. UML has two major components—a meta-model and a notation. The meta-model describes the objects, attributes and relationships necessary to represent the concepts of UML within a software application. There is a notation for modeling the dynamic elements of a design such as objects, messages, and finite state machines.

In an object-oriented application, classes have attributes (member variables), operations (member functions) and relationships. The fundamental element of the class diagram in UML is an icon representing the class. A class icon in UML is illustrated by a rectangle that is divided into three compartments. The top compartment contains the name of the class. The middle compartment contains a list of attributes and the bottom compartment contains a list of operations (functions). In many diagrams the lower two compartments are omitted. If present, they are used to show the attributes and operations that are useful for the particular diagram.

A black diamond represents composition. An arrowhead on the other end of the relationship denotes that the relationship is navigable in one direction. In UML, relationships are presumed to be bi-directional unless the arrowhead is present to restrict them. Composition relationships are a strong form of containment or aggregation. Aggregation is a whole/part relationship. The weak form of aggregation is denoted with an open diamond. The relationship denotes that the aggregate class is in some way the whole, and the other class in the relationship is somehow part of that whole. In UML, the ends of a relationship are referred to as its roles. If the end of a relationship is marked with an *, it indicates that the class at the aggregate class (client) end contains many instances (aggregate objects) of the class at the arrowhead end. The number appearing at either end of a relationship line indicates cardinality. Cardinality specifies how many instances of one class may be associated with a single instance of another class.

A triangular arrowhead depicts the inheritance relationship in UML. The arrowhead points to the base class. One or more lines can proceed from the base of the arrowhead connecting it to the derived classes. When the name of a class is shown in italics, this indicates that the class is an abstract class. If the operations are shown in italics, this indicates that they are virtual operations.

An association relationship is used to depict forms of containment that do not have whole/part implications. A line drawn between two participating classes represents an association. If the association has an arrowhead, this indicates that the class at the arrowhead end does not know anything about the attached class. Sometimes the relationship between two classes is very weak. A dashed arrow represents a dependency relationship between a client class and a supplier class to show that the client class depends on the supplier class to provide certain services.

Referring now to FIG. 2, business object 12 is an object contained in an application that requires access to information stored in a database. Business object 12 generally performs some business-related purpose like managing an accounting ledger, checking the spelling of a word, or performing some other form of analysis for the application. The application may retrieve data stored in a local database, manipulate it and store back into both the local database and a remote database. For the purpose of illustration, the local database is considered a proprietary database, and the remote database is considered a relational or object-oriented database. There can be more than one remote database, and the remote database can reside on a platform running a different operating system.

The business object 12 can have a plurality of methods defined and among these methods there are, for example, read( ), write( ) and createDataObject( ). The business object 12, through its createDataObject( ) method, can request that a data object 20 be created by the data object factory 22. The business object 12 can handle multiple instances of data object 20. It is a "one to many" (1:*) relationship between the business object 12 and data object 20. Data object 20 represents some logical grouping of information that is applicable to an application. For instance, a person data object for an address book application contains all relevant information about the person that the address book tracks. Data object 20 is created by data object factory 22 based on the needs of a business object 12.

The data object factory 22 is a singleton object. A singleton object is simply a class which is instantiated only once for a given application. The job of the data object factory 22 is to wait for requests to generate objects and return those objects to the requester. Data object 20 is created with the createDataObject( ) method of data object factory 22. Usually a factory is specialized and creates only one type of object. If it creates more than one type of object, then the object types are generally closely related. For instance, a single accounting totals factory object may create objects for store accounting totals and terminal accounting totals objects.

The storage object 24 provides the interface to a storage subsystem. The storage subsystem is responsible for distributing the data to converters that reform the data into an appropriate format for storage in a database of a given type. The storage object 24 is also responsible for maintaining a list of subscribing data access objects and publishing database update requests to each of them when directed to do so by a business object 12. The business object 12 interacts with the storage object 24 when it needs to access a database.

The storage object 24 has the following exemplary methods defined: attach( ), detach( ), notify( ), write( ) and read( ). The storage object 24 is also a singleton object.

Data access objects (DAOs) need to "register" themselves with the storage object 24 by "attaching" themselves to the storage object 24. DAOs are data observers. The observer pattern is defined as a one-to-many dependency between objects, so that when one object changes state, all of its dependents are notified and updated automatically. When applied to this invention, it means that when storage object 24 receives a request from business object 12 to read from, or to write to, the database, the storage object 24 notifies the various DAOs. It does this by publishing a database update request to its subscribing DAOs that a request has been received and then passing the data object 20 to the DAOs so they can respond accordingly. Note that box 32 in FIG. 2 is a simple description of a notification by the storage object 24 when a write request is received by the storage object 24.

Local data access object (DAO) 34, and remote DOA 36, are "observers" in this description. Local DAO 34 generally resides on the same platform as the storage object 24. Remote DAO 36 can reside on a platform that is separated geographically from the storage object 24. This remote platform can be running on an operating system that is different from the operating system on the local platform. Remote DAO 36 can exist as stand-alone server process and have additional logic to handle requests made across the network 11. DAOs 34, 36 have the responsibility for converting data between a data object form and a format that is used to store the data object's encapsulated information into a database. DAO 36 has a published remote interface called a stub that is available to the storage object 24 and that allows the data object 20 to be serialized and passed to a remote DAO 36. When a remote DAO 36 is instantiated, part of its configuration includes the address of the machine running the main application containing the business object 12. It registers with its storage object 24 when it is ready to receive update requests, and creates whatever additional objects are necessary for it to communicate with its target database through its interface with the database. In this description both the local DAO 34 and the remote DAO 36 are defined with the following methods: readAttributes( ), storeAttributes( ) and format( ).

The DAOs 34, 36 "flatten" the data object 20 by converting the information into an appropriate format before passing it to keyed file object 38 or other proprietary database interface if the data is to be stored in a proprietary database file, or to a database engine object 40 if the data is to be store in a relational or object-oriented database. Proprietary database interface object 38 is an object that owns and manages low level input/output (I/O) for a specific proprietary database file. Proprietary database interface object 38 usually has read( ) and write( ) methods defined to handle the data file process commands presented by DAO 34. Database engine object 40 is an object representing a real database engine application that processes SQL (Structured Query Language) commands presented by DAO 36. SQL is a standard interactive programming language for accessing information from and updating a database. Queries take the form of a command language that enables selecting, inserting, updating and locating data. Database engine object 40 has select( ), inserts and updates methods to handle a relational database.

Figure 3:
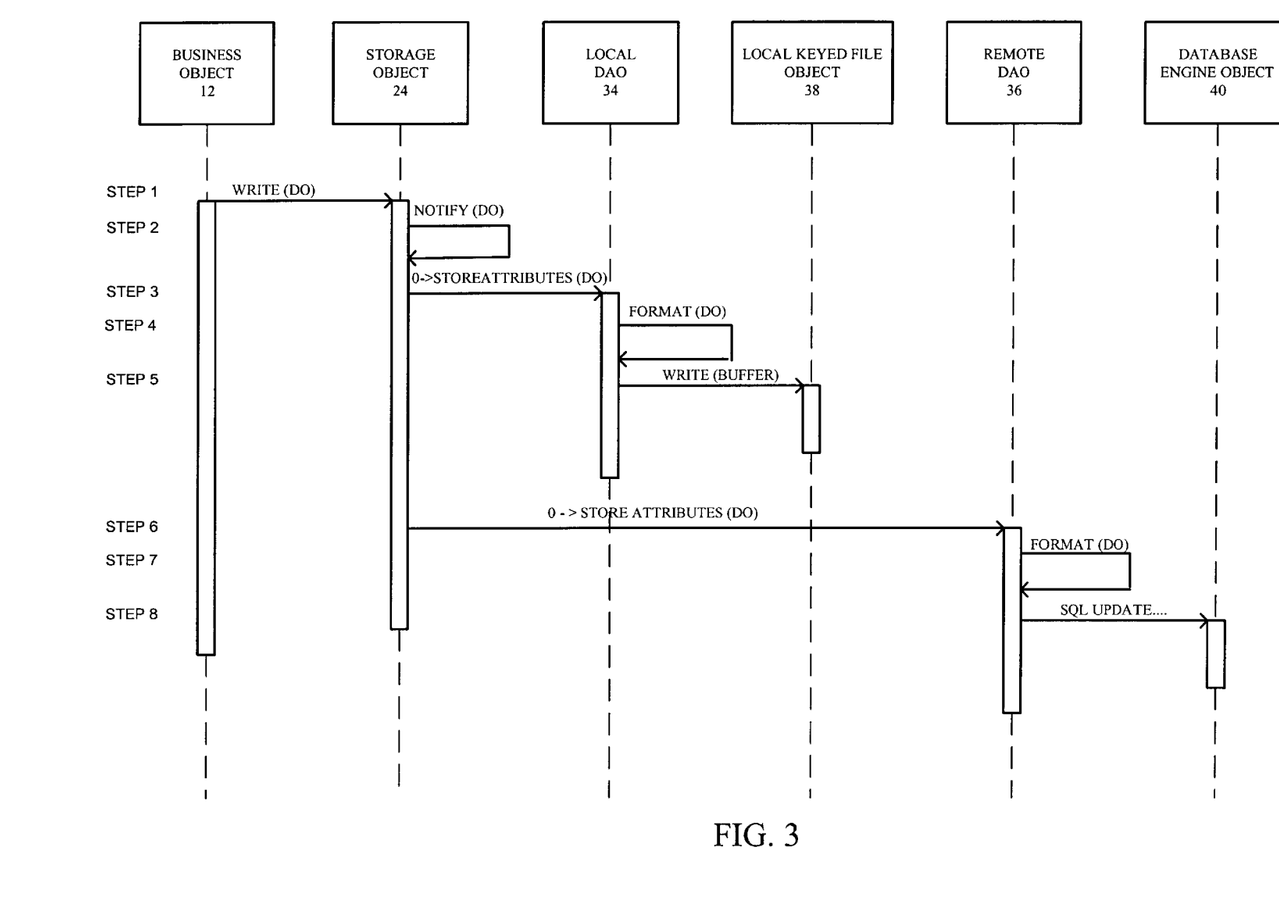
FIG. 3 is an exemplary diagram that illustrates interactions between different objects of the application data distribution system in accordance with a preferred embodiment of the present invention.

FIG. 3 is an exemplary UML interaction diagram for a write scenario to a database. Object names are generalized for the purpose of illustration. For the scenario depicted, it is assumed that the following events have already occurred:

1. all business objects 12, storage objects 24, and data access objects (DAOs) 34, 36 have been successfully instantiated;
2. the local 34 or remote 36 DAOs have registered with the storage object 24 that is managing the target portion of the database;
3. the business object 12 that is requesting the write to data object database has created an appropriate data object 20, used it to read data from the database, and manipulated the data it encapsulates such that it is ready to be stored.

The following sequence of steps, performed in response to a write data request, correspond to the step number shown on the left-hand side of FIG. 3.

Step 1: Business object 12 requests a data object's attributes to be written to the databases by calling StorageObject::write(DO) and passing the data object (DO) 20.

Step 2: StorageObject::write(DO) calls StorageObject::notify(DO) again passing the DO 20. The job of the Notify method is to publish the updated DO 20 to all subscribed data access objects 34, 36.

Step 3: Since, in the present case, the local version of the database is the primary version, its database is updated first. Notify(DO) does this by calling o->storeAttributes(DO) where "o" is a pointer to the local DAO object 34.

Step 4: In this example, the local DAO 34 interfaces with a keyed file object 38 which manipulates a specific proprietary database file. LocalDAO::storeAttributes (DO) calls LocalDAO::format(DO) to flatten the DO's attributes into a record which contains a key and is stored in a buffer. The buffer is returned to LocalDAO::storeAttributes(DO).

Step 5: LocalDAO::storeAttributes(DO) then calls LocalKeyedFileObject::write(buffer) and passes the formatted buffer. The write method reads the key from the first "n" bytes of the record and extrapolates a physical record to replace in the keyed file. The write buffer then writes the record to that location. If the record is locked by another process or some other error occurs, then an error object is created and returned to the local DAO 34. Once the operation is complete, control returns to StorageObject::notify(DO).

Step 6: StorageObject::notify(DO) now invokes the remote DAO's 36 storeAttributes method through its published remote stub interface and again passes the DO 20. The stub serializes the passed data object and transmits the serialized data stream to the remote DAO, where the data stream is deserialized back into an instantiated data object (DO).

Step 7: RemoteDAO::storeAttributes(DO) calls its format method to flatten the DO's attributes into one or more SQL update commands which are returned to storeAttributes in an array of buffers.

Step 8: storeAttributes(DO) then iterates through the array of buffers and invokes each SQL update command such that the database engine 40 can process the request and update the database.

Those skilled in the art will appreciate that more DAOs can be added easily to this process. When there is more than one DAO, one DAO 20 for a given data object type is designated as the primary DAO. Any DAO that is not designated as the primary DAO is defined as a secondary DAO. The primary DAO alone is notified for read( ) requests sent by a business object 12 and received by a storage object 24, since it does not make logical sense to read the same data from multiple databases. All the DAOs, whether primary or secondary, are notified of write( ) requests.

In the preferred embodiment, threads are used for updating the secondary DAOs, since the completion of their updates is not critical to the integrity of the system, and updating the secondary DAOs serially is likely be very time consuming, particularly for the remote DAOs, therefore, having a strong negative impact on system performance. This is in contrast to updating the primary DAO, which must be performed serially in order to ensure database integrity in an event-driven system where the order of objects receiving a given event is not necessarily deterministic.

For the secondary DAOs, threads can be spawned to launch and monitor the results of calls to the secondary DAOs. This allows processing in the main application to continue in lieu of the secondary DAOs processing time and remote locale. Errors encountered by the spawned threads could cause events to be raised and application events to be recorded.

Although not critical to the present invention, storage objects 24 are preferably created by factories and have virtual base classes that define their common behavior. Data access objects 34, 36 are also preferably created by factories and multiply inherit from two virtual base classes. The first base class defines behavior common to local DAOs 34 or remote DAOs 36. The second base class defines behavior common to the database type with which the DAO 34, 36 interface.

A data access object has primarily two defining characteristics—the database that it is responsible for manipulating and the types of data objects that it is programed to receive and handle. For a given application, there can be a plurality of DAOs each responsible for updating database "X", each with a different type of data derived from different data objects "Ys". Furthermore, there can be a plurality of DAOs responsible for handling a data object "Y" with each responsible for updating a different database "X". Therefore, it is appropriate to design the object model such that common behavior for database "X" is declared and defined in a base class for that database or database type. It is also appropriate to define a base class which describes common behavior for handling data objects of a certain type. This creates a two dimensional matrix for defining behavior and therefore describes a multiple inheritance design for the storage subsystem. A given DAO intended to handle certain data objects and update a certain database would inherit from the data object class and database base class appropriate for its task, and then determine the additional required behavior in the new subclass.

Figure 4:
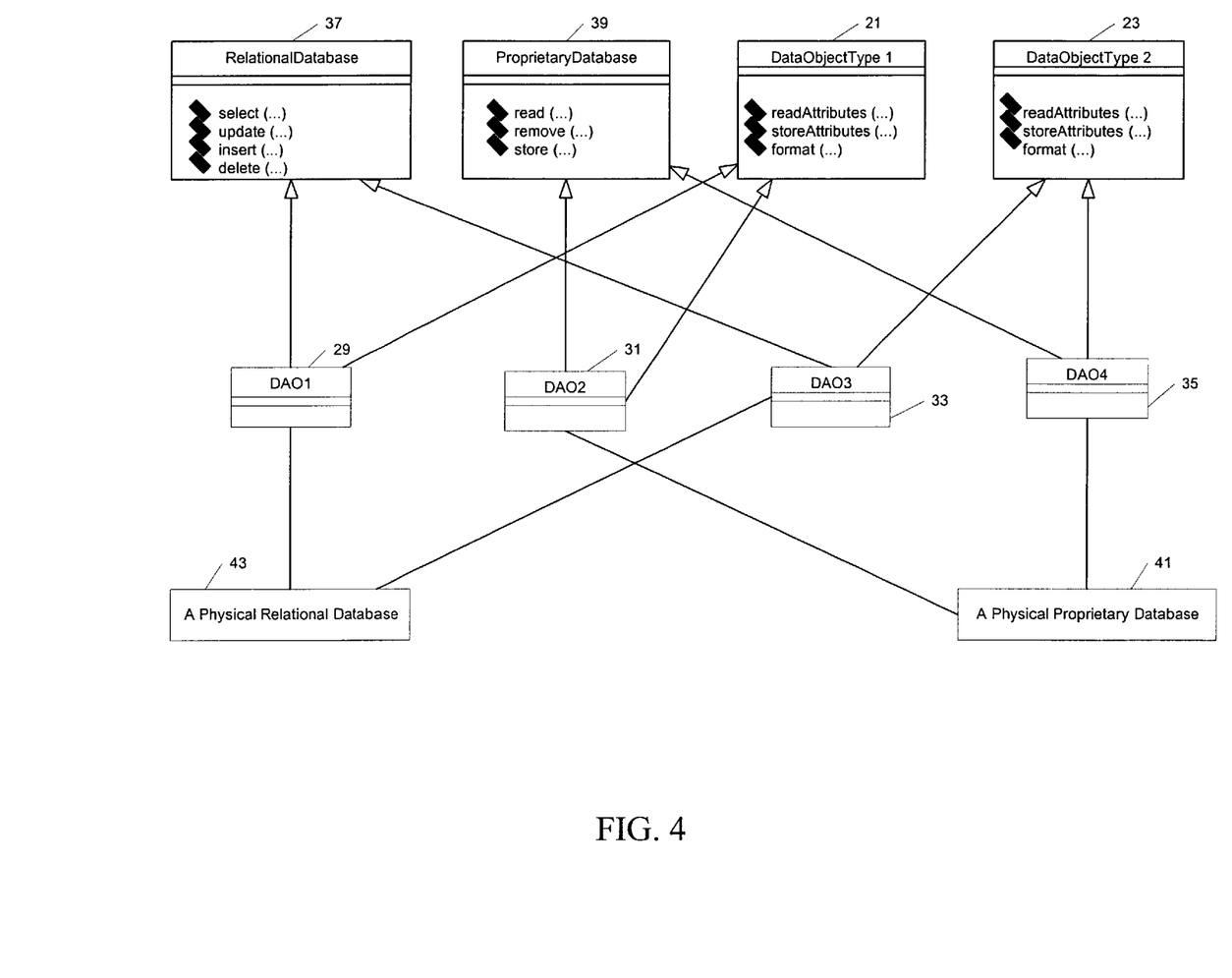
FIG. 4 is an exemplary diagram that illustrates the relationship between physical databases, derived data access objects and abstract base classes of the application data distribution system in accordance with a preferred embodiment of the present invention.

FIG. 4 illustrates an exemplary diagram of the relationship between physical databases, derived data access objects and abstract base classes of the storage subsystem. The numbers shown parenthetically in this description refer to reference numerals depicted in FIG. 4. This highly simplified diagram shows only two types of data objects 21, 23 and two types of databases 37, 39 (associated with physical relational database 43 and physical proprietary database 41, through their respective database interfaces). Also depicted are four data access objects - DAO1 (29), DAO2.(3 1), DAO3 (33), and DAO4 (35). The solid lines with triangular arrowheads between the DAOs and the database types and data object types indicate inheritance. Thus, in the situation depicted, DAO1 (29) inherits from RelationalDatabase (37) and DataObjectType1 (21). DAO2 (31) inherits from ProprietaryDatabase 39 and from DataObjectType1 (21). DataAccessObject 3 (33) inherits from RelationalDatabase 37 and from DataObjectType2 (23). Finally, DAO4 (35) inherits from PropietaryDatabase 39 and from DataObjectType2 (23). As further illustrated in FIG. 4, DAO1 (29) and DAO3 (33) are associated with physical relational database 43 through a database interface (not shown). Likewise, DAO2 (31) and DAO4 (35) are associated with physical proprietary database 41 through a proprietary database interface (not shown).

The following discussion pertains to the enablement of remote data access objects using C++ or Java methodology. Currently, the C++ language does not natively provide a simple remote method invocation environment like Remote Method Invocation (RMI)/Jini provides to the Java language. The Jini technology infrastructure is built around a model of clients looking for services. The notion of a service encompasses access to information, computation, software that performs particular tasks, and in general, any component that helps a user accomplish some goal. The Jini architecture requires a service to be defined in terms of a data type for the Java programming language that can be implemented in different ways by different instances of the service. The Jini system is Java technology-centered. The Jini architecture gains much of its simplicity from assuming that the Java programming language is the implementation language for components. The ability to dynamically download and run code is central to a number of the features of the Jini architecture, however, the Java technology-centered nature of the Jini architecture depends on the Java application environment rather than on the Java programming language. Any programming language can be supported by a Jini system if it had a compiler that produces compliant bytecodes for the Java programming language.

A Jini system consists of services that can be collected together for the performance of a particular task. Services may make use of other services, and a client of one service may itself be a service with clients of its own. Services in a Jini system communicate with each other by using a service protocol, which is a set of interfaces written in the Java programming language. The set of such protocols is open-ended. Communication between services can be accomplished using the Java Remote Method Invocation (RMI). The infrastructure to support communication between services is not itself a service that is discovered and used; rather it is a part of the Jini technology infrastructure. RMI provides mechanisms to find, activate, and garbage-collect object groups. Fundamentally, RMI is a Java-programming-language-enabled extension to traditional remote procedure call mechanisms. RMI allows not only data to be passed from object to object around a network, but full objects, including code. Much of the simplicity of the Jini system is enabled by this ability to move code around a network in a form that is encapsulated as an object.

In view of the foregoing discussion, there are two possible implementation strategies for enabling the remote DAOs:

1. A small DAO interface object can reside in the local subsystem that acts as a proxy for the remote DAO. The local proxy DAO can setup a TCP/IP socket connection to the remote DAO and then serialize the data object's attributes and pass them over the connection.
2. The remote DAOs could be implemented as Java applets and a thin JNI (Java Native to Interface) style interface layer could be written under the main application to convert the C++ data objects into Java Beans, or other Java-based object types. Data objects passed from a storage object to the remote DAO's local stub are then serialized and sent over the network to the remote DAO applet with a remote method call.

If the application containing the business object is written in C++, then an advantage to the first strategy is that the local application and remote DAOs remain entirely C++ objects. The disadvantage is that a new local proxy DAO object is required for each remote DAO, which potentially could be a sizable number, and code must be added to manage and coordinate the socket connections among them.

With respect to the second implementation strategy, a disadvantage to this approach is that the application may need to be written in two different languages. However, the Java Native Interface (JNI) was created specifically for the purpose of integrating Java into C++ applications.

The real advantage to using Java is the Jini/RMI implementation which is part of the Java Development Kit (JDK) and provides much of the network management code required to serialize the data objects and communicate between the main application and the applets. Additionally, Java provides the native ability to run on multiple platforms without compiling execuitables for each platform. In total, these factors should simplify the complete implementation of the inventive design. The cleanest and most efficient implementation strategy is that of the Java implementation due to the availability of RMI and the multi-platform capabilities of the Java language.

The system for distribution of application data to distributed databases of dissimilar formats of the present invention, has been described as an application program resident on a computer system with one or more associated local databases and one or more remote databases, the latter being to accessible over a public non-trusted network such as the Internet. It is important to note; however, that those skilled in the art will appreciate that the mechanisms of the present invention are capable of being distributed as a program product in a variety of forms and that the present invention applies regardless of the particular type of signal bearing media utilized to carry out the distribution. Examples of signal bearing media include, without limitation, recordable-type media such as diskettes or CD-ROMs, and transmission-type media such as analog or digital communication links.

Additionally, the corresponding structures, materials, acts and equivalents of any means plus function elements in any claims below are intended to include any structure, material, or acts for performing the functions in combination with other claimed elements as specifically claimed.

While the invention has been particularly shown and described with reference to a preferred embodiment thereof and using the object oriented design approach, it will be understood by those skilled in the art that various changes in form and detail may be made without departing from the spirit and scope of the present invention.

What is claimed is:

1. A method for distributing application program data to a plurality of databases of dissimilar formats, said method comprising:

defining a business object to represent a software application that needs to write data to one of said plurality of databases;

defining a plurality of data access objects, each capable of writing data to one of said plurality of databases in its respective format;

defining a storage object to represent an interface between said business object and said plurality of data access objects;

in response to a write request to one of said plurality of databases from said business object, generating a data object for data to be written to one of said plurality of databases;

sending said data object to each of said plurality of data access objects by said storage object;

converting data encapsulated in said data object by said plurality of data access objects into a respective format appropriate for each of said plurality of databases; and storing said encapsulated data into each of said plurality of databases according to its respective format by said corresponding data access objects.

2. The method of claim 1, further comprising registering each data access object with said storage object by each data access object attaching to the storage object.

3. The method of claim 1, further comprising maintaining a list of subscribing data access objects by said storage object.

4. The method of claim 1, wherein said generating step further includes sending a request for said data object to a data object factory by said business object.

5. The method of claim 1, wherein said generating step further includes generating said data object by said data object factory in response to said request.

6. The method of claim 1, wherein said plurality of databases include a proprietary database and a relational database.

7. The method of claim 1, wherein said plurality of databases include a proprietary database and an object-oriented database.

8. The method of claim 1, wherein one of said plurality of databases is locally stored on a computer processing system.

9. The method of claim 8, wherein a second database is stored remotely from said computer processing system and is accessible over a communications network.

10. A computer readable medium containing a program product for distributing program data to a plurality of databases of dissimilar formats, said program product comprising:

program instructions for defining a business object to represent a software application that needs to write data to one of said plurality of databases;

program instructions for defining a plurality of data access objects, each is capable of writing data to one of said plurality of databases in its respective format;

program instructions for defining a storage object to represent an interface between said business object and said plurality of data access objects;

in response to a write request to one of said plurality of databases from said business object, program instructions for generating a data object for data to be written to one of said plurality of databases;

program instructions for sending said data object to each of said plurality of data access objects by said storage object;

program instructions for converting data encapsulated in said data object by said plurality of data access objects into a respective format appropriate for each of said plurality of databases; and program instructions for storing said encapsulated data into each of said plurality of databases according to its respective format by said corresponding data access objects.

11. The program product of claim 10, further comprising program instructions that register each data access object with the storage object by enabling each data access object to attach to said storage object.

12. The program product of claim 10, further comprising program instructions that maintain a list of subscribing data access objects by said storage object.

13. The program product of claim 10, wherein said generating step further includes sending a request for said data object to a data object factory by said business object.

14. The program product of claim 10, wherein said generating step further includes generating said data object by said data object factory in response to said request for said data object.

15. The program product of claim 10, wherein said plurality of databases include a proprietary database and a relational database.

16. The program product of claim 10, wherein said plurality of databases include a proprietary database and an object-oriented database.

17. The program product providing for the distribution of program data of claim 10, wherein one database is locally stored on a computer processing system.

18. The program product providing for the distribution of program data of claim 10, wherein each database is locally stored on a computer processing system.

* * * * *